(12) United States Patent
Tsukada

(10) Patent No.: US 11,639,222 B2
(45) Date of Patent: May 2, 2023

(54) INFLATABLE KITE

(71) Applicant: TOYOTA JIDOSHA KABUSHIKI KAISHA, Toyota (JP)

(72) Inventor: Taro Tsukada, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/482,994

(22) Filed: Sep. 23, 2021

(65) Prior Publication Data

US 2022/0097841 A1 Mar. 31, 2022

(30) Foreign Application Priority Data

Sep. 25, 2020 (JP) .............................. JP2020-160669

(51) Int. Cl.
*B64C 31/06* (2020.01)
*A63H 27/08* (2020.01)

(52) U.S. Cl.
CPC ........... *B64C 31/06* (2013.01); *A63H 27/085* (2013.01); *B64C 2031/065* (2013.01)

(58) Field of Classification Search
CPC . B64C 31/06; B64C 2031/065; A63H 27/085; B64B 1/02; B64B 1/58
See application file for complete search history.

(56) References Cited

U.S. PATENT DOCUMENTS

| 4,534,525 A * | 8/1985 | Bliamptis ................. B64B 1/58 244/30 |
| 4,708,078 A * | 11/1987 | Legaignoux ......... B64D 17/025 244/145 |
| 5,816,537 A | 10/1998 | Pascoe et al. |
| 6,722,396 B1 * | 4/2004 | Sillat ......................... B64B 1/58 141/54 |
| 8,096,510 B2 * | 1/2012 | Shogren .................... B63H 8/14 244/153 R |
| 8,366,057 B2 | 2/2013 | Vos et al. |
| 2004/0245400 A1 * | 12/2004 | Montague ................ B63H 8/12 244/153 R |
| 2016/0325831 A1 * | 11/2016 | Harrington .............. B64C 31/06 |
| 2017/0096211 A1 * | 4/2017 | Morris ..................... B63H 8/16 |

FOREIGN PATENT DOCUMENTS

| DE | 694 02 064 T2 | 8/1997 |
| JP | 2003-026098 A | 1/2003 |

* cited by examiner

*Primary Examiner* — Medhat Badawi
*Assistant Examiner* — Vicente Rodriguez
(74) *Attorney, Agent, or Firm* — Dinsmore & Shohl LLP

(57) ABSTRACT

An inflatable kite includes a main tube and a sub tube. The inflatable kite includes: a first air chamber, which constitutes the sub tube; a second air chamber, which constitutes the sub tube and which is disposed at a position that is farther from the main tube than from the first air chamber in the sub tube; and a pressure regulator configured to adjust a pressure of the first air chamber and a pressure of the second air chamber. The sub tube cut by one plane that crosses in the direction of extension of the sub tube has a maximal cross-sectional area on a cross section of the first air chamber. The pressure regulator regulates the pressure of the first air chamber to be lower than the pressure of the second air chamber in a steady flight of the inflatable kite.

4 Claims, 1 Drawing Sheet

A-A CROSS SECTION

A-A CROSS SECTION

INFLATABLE KITE

CROSS-REFERENCE TO RELATED APPLICATIONS

This application is based upon and claims the benefit of priority of the prior Japanese Patent Application No. 2020-160669, filed on Sep. 25, 2020, the entire contents of which are incorporated herein by reference.

BACKGROUND

1. Technical Field

Embodiments of the present disclosure relate to an inflatable kite.

2. Description of the Related Art

For the inflatable kite, for example, there is proposed an inflatable kite that includes: an inner tube on a leading edge and a batten part; and a wing formed by injecting compressed air into the inner tube (refer to Japanese Patent Application Laid Open No. 2003-026098 (Patent Literature 1)).

The inflatable kite is desirably designed to have a relatively large cross-sectional area (in other words, outer diameter) of the batten part in order to improve airfoil performance and provide relatively high lift. On the other hand, it is desired to form the batten part so as to bend at a desired load so that a load inputted to a main tether connected to the inflatable kite is reduced when the inflatable kite is exposed to a strong wind. In order to form the batten part so as to bend at a desired load, it is necessary to keep the bending rigidity of the batten part relatively low; however, if the cross-sectional area of the batten part is set relatively large, the bending rigidity increases. In other words, the above two requirements conflict with each other, which is technically problematic.

In view of the problem described above, it is therefore an object of embodiments of the present disclosure to provide an inflatable kite that allows an improvement in an airfoil performance and that is configured to reduce a load inputted to a main tether under strong wind.

The above object of embodiments of the present disclosure can be achieved by an inflatable kite including a main tube that defines a leading edge shape of the kite and a sub tube that extends in a direction crossing a direction of extension of the main tube, the inflatable kite including: a first air chamber, which constitutes the sub tube; a second air chamber, which constitutes the sub tube and which is disposed at a position that is farther from the main tube than from the first air chamber in the sub tube; and a pressure regulator configured to adjust a pressure of the first air chamber and a pressure of the second air chamber, wherein the sub tube cut by one plane that crosses in the direction of extension of the sub tube has a maximal cross-sectional area on a cross section of the first air chamber, and the pressure regulator regulates the pressure of the first air chamber to be lower than the pressure of the second air chamber in a steady flight of the inflatable kite.

Here, "in the steady flight" practically means when it can be considered that there is no time change in airspeed. Incidentally, the "main tube" and the "sub tube" respectively correspond to the "leading edge" and the "batten part" described above.

DETAILED DESCRIPTION OF THE EMBODIMENT

Figure 1:
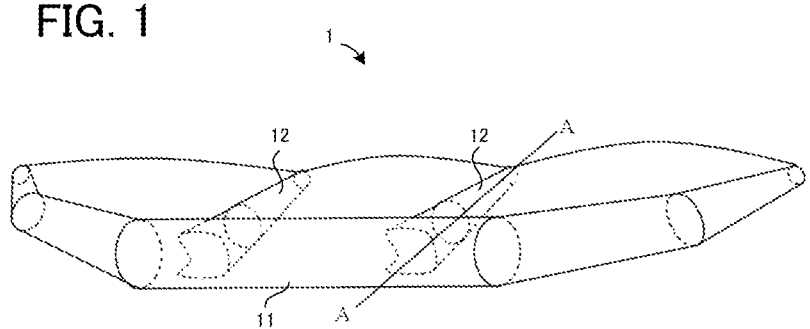
FIG. 1 is a diagram illustrating an inflatable kite according to an embodiment.
Figure 2A:
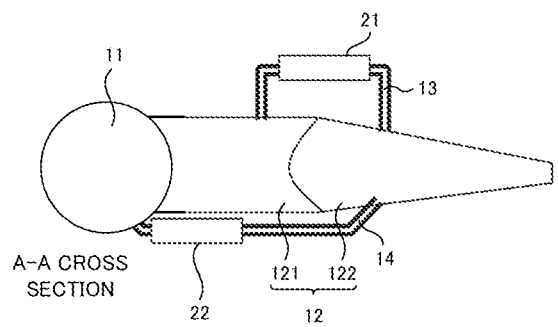
FIG. 2A is a A-A cross sectional view of FIG. 1.
Figure 2B:
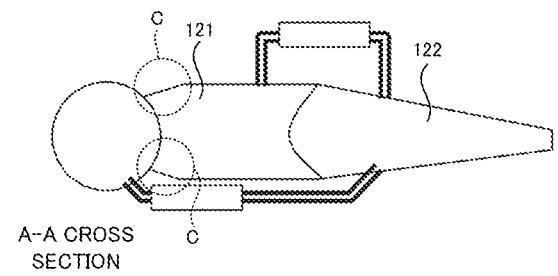
FIG. 2B is a A-A cross sectional view of FIG. 1.

An inflatable kite according to an embodiment will be described with reference to FIG. 1, FIG. 2A and FIG. 2B. In FIG. 1, an inflatable kite 1 (hereinafter, referred to as a "kite 1" as occasion demands) according to the embodiment includes a main tube 11, which defines a leading edge shape of the kite, and sub-tubes 12 (hereinafter referred to as "sub tubes 12"), each of which extends in a direction (hereinafter, appropriately referred to as a "chord direction") crossing a direction of extension of the main tube 11. Note that the number of the sub tubes 12 is not limited to 2, but may be 1, or 3 or more.

Each of the main tube 11 and the sub tubes 12 is hollow, and a gas such as, for example, air is enclosed. Here, as illustrated in FIG. 2A, the sub tube 12 includes an air chamber 121 and an air chamber 122. The sub tube 12 cut by one plane that crosses the chord direction has a maximal cross-sectional area on a cross section of the air chamber 121. That is, the area of a cross section of the air chamber 121 cut by one plane that crosses the chord direction is larger than the area of a cross section of the air chamber 122 cut by another plane that crosses the chord direction. In other words, an outer diameter of the air chamber 121 is larger than an outer diameter of the air chamber 122.

Note that the one plane and the other plane described above are parallel to each other. An example of the plane that crosses the chord direction (corresponding to the one plane and the other plane described above) may be a plane that is perpendicular to the chord direction, in other words, a plane with the chord direction as a normal direction. The "cross section of the sub tube 12 cut by one plane that crosses the chord direction" may mean a "cross section cut by one plane that is perpendicular to the chord direction".

The outer diameter of the air chamber 121 may not always be larger than the outer diameter of the air chamber 122. As long as the sub tube 12 cut by one plane that crosses the chord direction has a maximal cross-sectional area on the cross section of the air chamber 121, a part of the outer diameter of the air chamber 121 may be smaller than the outer diameter of the air chamber 122, as illustrated in FIG. 2B (refer to dotted circles C in FIG. 2B).

Each of the sub tubes 12 has a channel 13 and a channel 14. The channel 13 connects the air chamber 121 and the air chamber 122. The chamber 14 connects the air chamber 122 and the main tube 11. In FIG. 2A, the channel 13 and the channel 14 (as well as a pressure regulating apparatus 21 and a pressure regulating apparatus 22 described later) are disposed outside the main tube 11 and the sub tube 12 (i.e., outside an inflatable structure), but may be included in the main tube 11 and/or the sub tube 12.

The pressure regulating apparatus 21 is disposed in the channel 13. The pressure regulating apparatus 21 is configured to regulate the pressure of the air chamber 121 and the pressure of the air chamber 122. The pressure regulating apparatus 22 is disposed in the channel 14. The pressure regulating apparatus 22 is configured to regulate the pressure of the air chamber 122 and the pressure of the main tube 11. An example of the pressure regulating apparatus 21 and the pressure regulating apparatus 22 includes a pressure regulator, a pressure regulating valve, a pump and the like.

The pressure regulating apparatus 21 and the pressure regulating apparatus 22 may be controlled on the basis of signals transmitted from ground-side equipment (not illustrated), for example, by wireless communication, wire communication, or the like. Alternatively, the pressure regulating apparatus 21 and the pressure regulating apparatus 22 may be controlled by a control unit (not illustrated) mounted on the kite 1.

In the steady flight of the kite 1, the pressure regulating apparatus 21 regulates the pressure of the air chamber 121 to be lower than the pressure of the air chamber 122. This configuration allows bending rigidity associated with the air chamber 121 to be smaller than bending rigidity associated with the air chamber 122. Therefore, if the kite 1 receives a gust in the steady flight of the kite 1, the sub tube 12 bends in a part corresponding to the air chamber 121, so that aerodynamic force applied to the entire kite 1 can be reduced.

When the kite 1 is exposed to an airflow that is faster than a design value of the airspeed, or if the kite 1 is likely to be exposed to the airflow that is faster than the design value in the future, then, at least one of the pressure regulating apparatus 21 and the pressure regulating apparatus 22 regulates the pressure of the air chamber 121 to be higher than the pressure of the air chamber 122. Here, "faster than the design value of the airspeed" means "faster than an upper limit value of an airspeed range assumed in design".

For example, the pressure regulating apparatus 21 may transmit the gas enclosed in the air chamber 122 to the air chamber 121 through the channel 13 to pressurize the air chamber 121 and may depressurize the air chamber 122, so that the pressure of the air chamber 121 may be higher than the pressure of the air chamber 122. Moreover, the pressure regulating apparatus 22 may transmit the gas enclosed in the air chamber 122 to the main tube 11 through the channel 14 and may depressurize the air chamber 122, so that the pressure of the air chamber 121 may be higher than the pressure of the air chamber 122. At this time, the air chamber 121 may be pressurized until it becomes equal to the pressure of the main tube 11. The air chamber 122 may be depressurized to the same extent as the atmospheric pressure.

This configuration allows an effective wing area of the kite 1 to be reduced, thereby allowing a load applied on the kite 1 (and moreover, a main tether connected to the kite 1, or the like) to be reduced.

Incidentally, whether or not the kite 1 is exposed to the airflow that is faster than the design value may be determined, for example, on the basis of outputs of various sensors provided for the ground-side equipment, the weather forecast, or the like. In the same manner, whether or not the kite 1 is likely to be exposed to the airflow that is faster than the design value in the future may be predicted, for example, on the basis of the outputs of various sensors provided for the ground-side equipment, the weather forecast, or the like.

As illustrated in FIG. 1, when the kite 1 includes two sub tubes 12, at least one of the pressure regulating apparatus 21 and the pressure regulating apparatus 22 may differentiate the pressure of one of the two sub tubes 12 and the pressure of the other of the two sub tubes 12 in order to control a posture of the kite 1. The pressure of the sub tube 12 may be, for example, an average value of the pressure of the air chamber 121 and the pressure of the air chamber 122. By making a difference between the pressure of one of the sub tubes 12 and the pressure of the other sub tube 12, there is a difference in the rigidity of right and left wings of the kite 1. As a result, different lift and drag are caused on the left and right of the kite 1, and it is thus possible to change (i.e., control) the posture to the kite 1.

This configuration allows the posture of the kite 1 to be guided to a desired posture in the case of failure such as, for example, when the main tether connected to the kite 1 is broken, and it is very useful in practice. In addition, the pressure regulating apparatus 21 and the pressure regulating apparatus 22 may completely vent the gas in each sub tube 12 upon failure. This configuration allows most of the lift of the kite 1 to be lost, thereby allowing the kite 1 to quickly return to the ground upon failure.

As described above, the outer diameter of the air chamber 121 is larger than the outer diameter of the air chamber 122. That is, the sub tube 12 of the kite 1 has a relatively large outer diameter (in other words, cross-sectional area). Therefore, the kite 1 is allowed to improve the airfoil performance. On the other hand, as described above, the pressure of the air chamber 121 is lower than the pressure of the air chamber 122 in the steady flight. Therefore, in the kite 1, as compared with when the pressure in the sub tube 12 is uniform, it is possible to keep the bending rigidity of the sub tube 12 partially low. As a result, the sub tube 12 can be configured to bend at a desired load when the kite 1 is exposed to a strong wind, thereby reducing a load inputted to the main tether connected to the kite 1. As described above, according to the kite 1, it is possible to improve the airfoil performance and to reduce the load inputted to the main tether under strong wind.

In the above described embodiment, the pressure regulating apparatus 21 is provided in the channel 13 and the pressure regulating apparatus 22 is provided in the channel 14; however, instead of the pressure regulating apparatus 21 and the pressure regulating apparatus 22, for example, a pressure regulating apparatus for regulating the main tube 11, a pressure regulating apparatus for regulating the air chamber 121, and a pressure regulating apparatus for regulating the air chamber 122 may be provided.

Aspects of embodiments of the present disclosure derived from the embodiment described above will be described below.

An inflatable kite according to an aspect of embodiments of the present disclosure is an inflatable kite including a main tube that defines a leading edge shape of the kite and a sub tube that extends in a direction crossing a direction of extension of the main tube, the inflatable kite including: a first air chamber, which constitutes the sub tube; a second air chamber, which constitutes the sub tube and which is disposed at a position that is farther from the main tube than from the first air chamber in the sub tube; and a pressure regulator configured to adjust a pressure of the first air chamber and a pressure of the second air chamber, wherein the sub tube cut by one plane that crosses in the direction of extension of the sub tube has a maximal cross-sectional area on a cross section of the first air chamber, and the pressure regulator regulates the pressure of the first air chamber to be lower than the pressure of the second air chamber in a steady flight of the inflatable kite.

In the above described embodiment, the "air chamber 121" corresponds to an example of the "first air chamber", the "air chamber 122" corresponds to an example of the "second air chamber", and the "pressure regulating apparatus 21 and the pressure regulating apparatus 22" correspond to an example of the "pressure regulator".

In an aspect of the inflatable kite, the pressure regulator regulates the pressure of the first air chamber to be higher than the pressure of the second air chamber in a flight of the inflatable kite at a high wind speed. "When the kite 1 is exposed to the airflow that is faster than the design value of the airspeed" in the above described embodiment corresponds to an example of "in a flight of the inflatable kite at a high wind speed".

In another aspect of the inflatable kite, the inflatable kite includes a plurality of the sub tubes, and the pressure regulator differentiates a pressure of one of the plurality of sub tubes and a pressure of another of the plurality of sub tubes in order to control a posture of the inflatable kite.

The inflatable kite according to embodiments of the present disclosure is applicable, for example, to wind power generation, solar power generation, communication or the like.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An inflatable kite including a main tube that defines a leading edge shape of the kite and a sub-tube that extends in a direction crossing a direction of extension of the main tube, the inflatable kite comprising:
    a first air chamber, which constitutes the sub-tube;
    a second air chamber, which constitutes the sub-tube and which is disposed at a position that is farther from the main tube than from the first air chamber in the sub-tube; and
    a pressure regulator configured to adjust a pressure of the first air chamber and a pressure of the second air chamber, wherein
    the sub-tube cut by one plane that crosses in a direction of extension of the sub-tube has a maximal cross-sectional area on a cross section of the first air chamber, and
    the pressure regulator regulates the pressure of the first air chamber and the pressure of the second air chamber such that the pressure of the first air chamber is lower than the pressure of the second air chamber in a steady flight of the inflatable kite.

2. The inflatable kite according to claim 1, wherein the pressure regulator regulates the pressure of the first air chamber such that the pressure of the first air chamber is higher than the pressure of the second air chamber in a flight of the inflatable kite at a high wind speed.

3. The inflatable kite according to claim 1, wherein
    the inflatable kite includes a plurality of the sub-tubes, and
    the pressure regulator differentiates a pressure of one of the plurality of the sub-tubes and a pressure of another of the plurality of the sub-tubes in order to control a posture of the inflatable kite.

4. The inflatable kite according to claim 2, wherein
    the inflatable kite includes a plurality of the sub-tubes, and
    the pressure regulator differentiates a pressure of one of the plurality of the sub-tubes and a pressure of another of the plurality of the sub-tubes in order to control a posture of the inflatable kite.

* * * * *